United States Patent

[11] 3,633,750

[72] Inventors Harvey A. Braun
Moreland Hills, Ohio;
Richard J. Roberts, Somerville, N.J.
[21] Appl. No. 53,804
[22] Filed July 10, 1970
[45] Patented Jan. 11, 1972
[73] Assignee Filter Dynamics International, Inc.
Edison, N.J.

[54] FILTER ELEMENT VALVE MEANS
3 Claims, 3 Drawing Figs.
[52] U.S. Cl............................................ 210/130,
210/136, 210/440, 210/443, 210/457
[51] Int. Cl....................................... B01d 35/14,
B01d 27/10
[50] Field of Search.......................... 210/130,
136, 440, 457, 443

[56] References Cited
UNITED STATES PATENTS
| | | | |
|---|---|---|---|
| 2,995,249 | 8/1961 | Boewe et al. .................. | 210/457 X |
| 3,146,194 | 8/1964 | Hathaway..................... | 210/443 X |
| 3,243,045 | 3/1966 | Tietz ............................ | 210/130 |
| 3,315,809 | 4/1967 | Hultgren ..................... | 210/440 X |

Primary Examiner—Frank A. Spear, Jr.
Attorney—Charles Marks

ABSTRACT: An end-reinforcing plate on a filter housing is provided with inlet apertures covered with antidrainback means held in abutment with the plate by an inverted, cup-shaped element formed on an end cap which accommodates an annular filter medium. The end cap also includes relief ports covered by a spring-biased plate which is separable from the end cap to permit oil introduced through the inlet apertures to escape through an outlet aperture when the oil cannot pass through the filter medium.

PATENTED JAN 11 1972

INVENTORS.
HARVEY A. BRAUN
RICHARD J. ROBERTS
BY Charles Marks 3,633,750

FILTER ELEMENT VALVE MEANS

BACKGROUND OF THE INVENTION

1. Field of the Invention

This invention relates generally to filters and is more particularly concerned with an improved throwaway-type oil filter used in conjunction with automotive or other kinds of engines and having an antidrain back valve and a bypass valve.

2. Description of the Prior Art

In the throwaway-type of oil filter, as commonly used, a filter cartridge comprising a filter medium such as an annularly disposed, pleated filter paper, is received within a filter shell permanently sealed by a suitable end closure and adapted for connection with an engine-lubricating system. The end closure is often provided with a series of inlet apertures whereby oil to be filtered may be introduced from the engine-lubricating system into the filter shell and allowed to flow into the vicinity of the aforesaid filter paper. Since the oil is usually introduced into the filter shell under pressure, it may be forced through the filter paper so as to accomplish filtration of the oil, which then flows into an outlet passage leading back to the engine-lubricating system.

During the useful life of such a filter, however, it is highly undesirable to permit unfiltered oil to return to the engine by way of drain back through the aforesaid inlet apertures or by way of any other route which permits the oil to avoid being forced through the filter paper; and consequently, various means have been devised for preventing such drain back.

It has also been recognized that where dirt, debris, contaminants and other foreign matter build up on the filter paper to a point where they prevent an adequate flow of oil therethrough, it is desirable to permit the oil to bypass the filter paper and return to the lubricating system pending discard of the filter and replacement thereof. Hence, it has been customary to provide bypass means for this purpose.

However, the bypass means and antidrain back means which have heretofore been employed, have often been unduly intricate and have required numerous, specially formed parts or special manufacturing operations, all of which has entailed corresponding expense. Moreover, by reason of the complexity of conventional designs of this kind, there is a corresponding amount of maintenance required, which also adds to the expense incurred by the user.

The present invention is concerned with a solution to these problems. More specifically, it is an object of the present invention to provide a throwaway filter having improved antidrain back and bypass means.

Another object of the invention is to provide such a filter wherein the antidrain back and bypass means are of simple and economical design, and employ a minimum of parts.

Another object of the invention is to provide such a filter wherein the maintenance required for the antidrain back and bypass means is reduced to a minimum.

Other objects and advantages of the present invention will become apparent from the following description when read in conjunction with the accompanying drawings.

SUMMARY OF THE INVENTION

In the present invention, the antidrain back means comprises a flexible member disposed directly above the oil inlet apertures formed in an end-reinforcing plate of the filter housing, said flexible member being secured in abutment with the end-reinforcing plate by a tubular extension provided with a flange formed integrally with an end cap of the filter paper employed. The flange is provided with a plurality of relief ports whereby oil which cannot pass through the filter paper may urge a spring supported valve plate out of contact with the tubular extension, thereby permitting the oil to bypass the filter paper and escape into the outlet aperture of the filter and thence to the engine-lubricating system.

BRIEF DESCRIPTION OF THE DRAWINGS

In the drawings.

Throughout the foregoing views, similar numerals are employed to refer to similar parts of the invention.

DESCRIPTION OF THE PREFERRED EMBODIMENT

Figure 1:
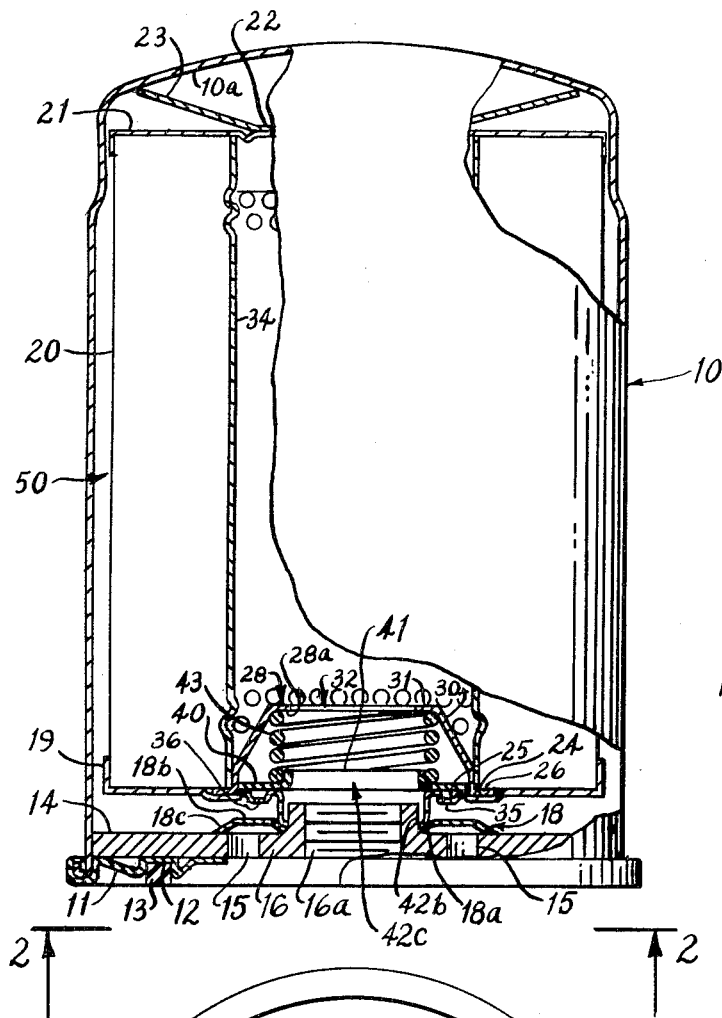
FIG. 1 is a partially cross-sectioned elevation of one embodiment of the invention.
Figure 2:
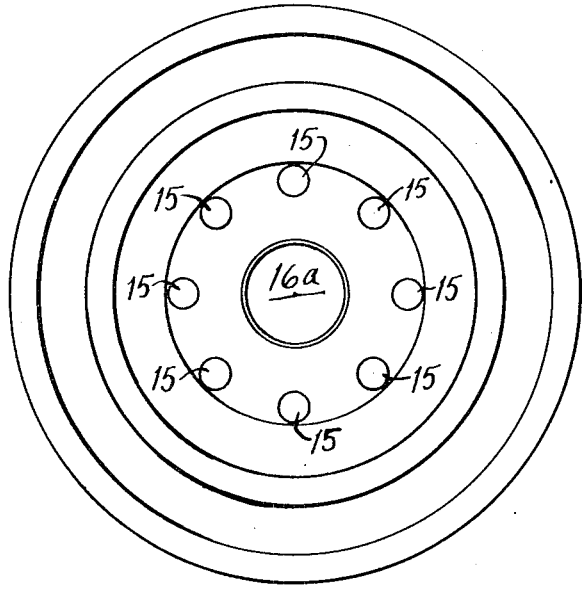
FIG. 2 is a bottom view of the said embodiment of the invention taken about the line 2—2 of FIG. 1.
Figure 3:
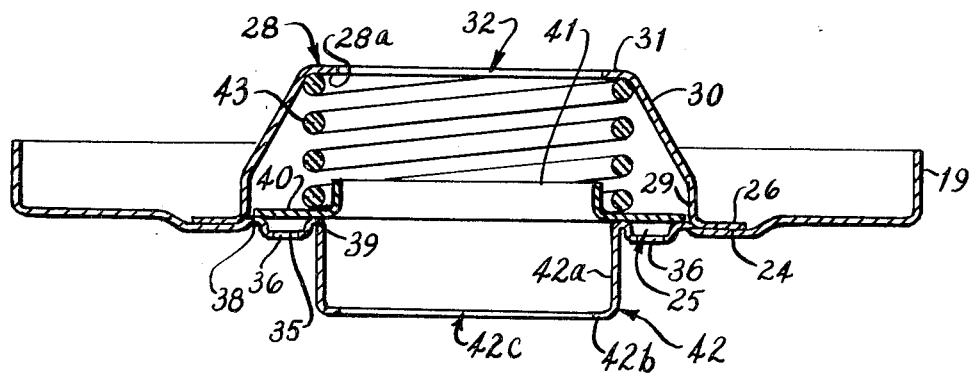
FIG. 3 is an enlarged, cross-sectional view of the bypass means employed in said embodiment of the invention.

As shown in the accompanying drawings, one embodiment of the invention comprises a filter unit of the throwaway-type having a cup-shaped housing, generally designated by the numeral 10, provided with an end plate 11 having a channel 12 which accommodates a suitable gasket 13. This gasket 13 is abuttable against an engine block (not shown) so as to seal the filter unit against the engine block when said filter unit is in operative use.

The end plate 11 is surmounted by an end-reinforcing plate 14 which is provided with a plurality of inlet apertures 15 and a threaded, centrally disposed tube 16 having an outlet aperture 16a, which may be threadedly engaged with an inlet member (not shown) of an automotive lubricating system (not shown), in the conventional manner.

The tube 16 accommodates an annular, antidrain back valve, generally designated by the numeral 18 and comprising a lower, inwardly extending annular lip 18a surrounding the tube 16 and an upper flange 18b extending laterally of the annular lip 16a, said upper flange 18b also being provided with an inclined perimetric element 18c. Said annular lip 18b and said perimetric element 18c abut against the end-reinforcing plate 14. The antidrain back valve 18 is preferably composed of a yieldable, resilient material such as a suitable elastomer or springable metal.

Above the antidrain back valve 18 and end-reinforcing plate 14 is a lower end cap generally designated by the numeral 19 and accommodating in the conventional manner a portion of an annularly disposed filter medium such as the pleated, paper filter 20 customarily employed in filter units of the throwaway kind, said filter medium also being surmounted in the conventional manner by an upper end cap 21 of conventional design, which upper end cap 21, in turn, is surmounted by a springable member 22, the ends 23 of which are biased against the inner surface 10a of the upper end of the housing 10.

The lower end cap 19 is provided with concentric grooves 24 and 25. The outer groove 24 is surmounted by a flange 26 formed integrally with an inverted cup-shaped member, generally designated by the numeral 28 and including a vertical tubular element 29 communicating with said flange 26 and with a tapered element 30 which, in turn, communicates with an upper, laterally extending lip 31 surrounding a central aperture 32 in said inverted cup-shaped member 28.

The inner perimetral portion 33 of the pleated, paper filter 20 is seated upon the flange 26, said pleated, paper filter 20 also being provided with a perforated tubular core 34 of conventional design, which tubular core 34 is disposed on the innermost surface of the pleated, paper filter 20 and also is seated upon said flange 26.

The inner groove 25 provided in the lower end cap 19 has a laterally extending base 35 formed with a plurality of relief ports 36. The marginal perimeters 38, 39 of said groove 25 are surmounted by an annular plate 40 provided with a central, tubular member 41 disposed coaxially with the tubular core 34, central aperture 32 and tube 16.

The lower end cap 19 is also provided with a centrally disposed, cup-shaped element, generally designated by the numeral 42 and having a sidewall 42a and a lower annular lip 42b surrounding an aperture 42c which accommodates the tube 16, said lower annular lip 42b surmounting the annular lip 18a of the antidrain back valve 18, thereby maintaining said annular lip 18a and inclined perimetric element 18c of the antidrain back valve 18 in abutment with the end-reinforcing plate 14 so as to seal the interior of the filter unit against the introduction of oil until the pressure thereof is sufficient to overcome the springable bias of the inclined perimetric element 18c so as to separate it from the end-reinforcing plate 14.

A coiled compression spring 43 is seated upon the inner surface 28a of the laterally extending lip 31 of the inverted cup-shaped member 28, and urges the annular plate 40 into abutment with the marginal perimeters 38, 39 of the groove 25.

In operation, the oil to be filtered is introduced under pressure through the inlet apertures 15, thereby urging the perimetric element 18c of the antidrain back valve 18 to separate from the end-reinforcing plate 14 and thus permit said oil to flow to the region 50, which is between the cup-shaped housing 11 and the paper filter 20, from which region 50, the oil flows through said paper 20 and the perforated, tubular core 34. The oil thus filtered then flows through the central aperture 32, the tubular member 41, the cup-shaped element 42 and the aperture 16a, from whence said oil returns to the engine-lubricating system.

In the event that the paper filter 20 is clogged with dirt, debris, contaminants and the like, so that filtration of the oil cannot be accomplished adequately, it flows through the relief ports 36 and the pressure of said oil is exerted upon the annular plate 40 so as to overcome the bias of the spring 43, thereby separating said annular plate 40 from the marginal perimeters 38, 39 of the groove 25. The oil then flows through the tubular member 41, the cup-shaped element 42 and the aperture 16a, and thereupon returns to the engine-lubricating system.

In this condition, the useful life of the filter unit has ended, thereby rendering it appropriate to discard it and effect replacement thereof in accordance with conventional practice.

The embodiment of the invention illustrated and described hereinabove has been selected for the purpose of clearly setting forth the principles involved. It will be apparent, however, that the present invention is susceptible to being modified in respect to details of construction, combination and arrangement of parts which may be resorted to without departure from the spirit and scope of the invention as claimed.

We claim:

1. In an oil filter housing enclosing an annularly disposed filter medium, the combination comprising:
   a. an end plate affixed to the oil filter housing;
   b. an end-reinforcing plate surmounting said end plate;
      i. said end-reinforcing plate being provided with a plurality of inlet apertures adapted to receiving oil to be filtered;
      ii. said end-reinforcing plate also being provided with a centrally disposed outlet aperture;
   c. annular antidrain back means surmounting said end-reinforcing plate and surrounding said centrally disposed outlet aperture;
   d. said antidrain back means yieldably covering said inlet apertures;
   e. said annularly disposed, filter medium accommodating a perforated tubular core;
   f. said filter medium being accommodated within upper and lower end caps;
   g. said lower end cap including inner and outer concentric grooves;
   h. said outer concentric groove being surmounted by an inverted cup-shaped member having a centrally disposed aperture defined by an annular lip;
   i. said inner concentric groove having annular, marginal perimeters and a base portion provided with a plurality of relief ports;
   j. said annular, marginal perimeters being surmounted by an annular plate having a centrally disposed tubular member,
   k. spring means seated between said annular plate and said annular lip, thereby yieldably urging said annular plate into abutment with said annular, marginal perimeters;
   l. said lower end cap also including a cup-shaped element formed integrally with the inner marginal perimeter of said inner, concentric groove and having an aperture accommodating said centrally disposed outlet aperture;
   m. said oil to be filtered including foreign matter and being transmissible through said filter medium to remove said foreign matter, said oil then being transmissible through said perforated tubular core, whence it is communicable with said outlet aperture;
   n. said oil being communicable through said relief ports and into contact with said annular plate to dispose it in spaced relation with respect to the marginal perimeters to said inner concentric groove, thereby permitting said oil to communicate with said outlet aperture upon clogging of said filter medium by said foreign matter.

2. In a device according to claim 1, the annular antidrain back means including:
   a. an inwardly extending annular lip in abutment with said end-reinforcing plate;
   b. an upper flange extending laterally of the centrally disposed outlet aperture of said end-reinforcing plate, said upper flange being in spaced relation with respect to said end-reinforcing plate;
   c. an inclined perimetric element depending from said upper flange and disposed in abutment with said end-reinforcing plate.

3. In a device according to claim 1, the inverted cup-shaped means including:
   a. a flange accommodated within said outer concentric groove, said flange being surmounted by said perforated tubular core;
   b. said flange communicating with a vertical tubular element accommodated within said perforated tubular core;
   c. said vertical tubular element being provided with a tapered element communicating with said annular lip.

* * * * *